United States Patent
Elkins

(10) Patent No.: US 8,645,005 B2
(45) Date of Patent: Feb. 4, 2014

(54) MULTIPURPOSE MODULAR AIRSHIP SYSTEMS AND METHODS

(76) Inventor: Alfred B. Elkins, Fredericksburg, VA (US)

( * ) Notice: Subject to any disclaimer, the term of this patent is extended or adjusted under 35 U.S.C. 154(b) by 72 days.

(21) Appl. No.: 12/875,411

(22) Filed: Sep. 3, 2010

(65) Prior Publication Data

US 2011/0118907 A1    May 19, 2011

Related U.S. Application Data

(60) Provisional application No. 61/247,748, filed on Oct. 1, 2009.

(51) Int. Cl.
  *G01C 23/00* (2006.01)
  *G05D 1/00* (2006.01)
  *G05D 3/00* (2006.01)
  *G06F 7/00* (2006.01)
  *G06F 17/00* (2006.01)
  *B64B 1/06* (2006.01)

(52) U.S. Cl.
  USPC ........ 701/3; 244/24; 244/25; 244/26; 244/27; 244/28; 244/29; 244/30

(58) Field of Classification Search
  USPC .......................... 701/3, 4; 224/24; 244/24–33
  See application file for complete search history.

(56) References Cited

U.S. PATENT DOCUMENTS

| | | | |
|---|---|---|---|
| 7,356,390 B2* | 4/2008 | Knoblach et al. | 701/4 |
| 2008/0149758 A1* | 6/2008 | Colgren et al. | 244/13 |
| 2008/0179453 A1* | 7/2008 | Thompson | 244/30 |

OTHER PUBLICATIONS

Nordestgaard et al., University of Adelaide airship project with notes, University of Adelaide.
Airship Solutions website, available online at airship.com.au/default.htlm (last accessed Sep. 22, 2012).

* cited by examiner

*Primary Examiner* — Thomas Tarcza
*Assistant Examiner* — Kevin Myhre
(74) *Attorney, Agent, or Firm* — Christopher Paul Mitchell

(57) ABSTRACT

Embodiments according to the methods and systems provide for the selection, assembly, deployment, exploitation of data collected, redeployment, retrieval and stowage of a remotely operated lighter than air (LTA) network of vehicles. From modular components stowed with a mobile platform, one or more LTA vehicles can be assembled, deployed and retrieved. Determining the desirable number of LTA vehicles and the modular components to be assembled for each vehicle can be performed through a computer recommending modular components based on mission parameters. A remote controller device can be used for pre-deployment setup, in-flight mission management and analysis of data gathered by a plurality of possible sensing devise operably attached to the one or more LTA vehicles.

15 Claims, 12 Drawing Sheets

MULTIPURPOSE MODULAR AIRSHIP SYSTEMS AND METHODS

CROSS REFERENCE TO RELATED APPLICATION

This application claims benefit of and priority to U.S. Provisional Patent Application Ser. No. 61/247,748, filed Oct. 1, 2009, which is fully incorporated by reference herein and made a part hereof

FIELD

Embodiments of the present methods and systems are generally directed toward the deployment, launching, controlling, recovering and retrieving of remotely operated modular airships. Specifically, embodiments described herein are directed to autonomous and semi-autonomous deployment, operation and retrieval of a plurality of modular airships.

BACKGROUND

Remotely operated heavier than air vehicles are used by many private and public organizations. Recently, there has been increasing interest in autonomous and semi-autonomous air vehicles. The traditional heavier than air vehicles are important tools to organizations such as the Department of Defense and the Department of Homeland Security for surveillance of fixed and mobile interests. However, these heavier than air systems are generally limited in attainable duration and by legal and operational elevation restrictions. Heavier than air systems that are capable of long flight time or high elevation tend to be prohibitively expensive and complex. One possible solution is to employ lighter than air vehicles. Blimps and balloons have been used for many years as observation platforms and recently, some have been outfitted with remotely operable controls. However, these systems require dedicated hangers, are large and cumbersome to deploy and retrieve, are deployed in single-ship flights only, and are designed with mission specific requirements with little flexibility for field reconfiguration.

Therefore, what is needed is a flexible system of lighter than air vehicles that can be autonomously, semi-autonomously, or man-in-the-loop operated, and that are designed such that they can be deployed, serviced and retrieved from mobile platforms. Furthermore, what is needed is a flexible system in which a user can selectively choose between integrated modular subsystems to modify a vehicle for multipurpose operations.

SUMMARY

In one embodiment, the systems and methods describe a network of lighter-than-air (LTA) vehicles controlled and configured by a remotely operated interface device. The network of LTA vehicles can be configured with a plurality of modular parts to accommodate the requirements of varying missions. Modular parts can consist of various sized, field-configurable envelopes, engines, rudders, fins or elevators, gondolas, valves, stowage system, support equipment and mission specific devices to name but a few. In another embodiment, factors including, but not limited to mission duration, distance, payload, and environment can be used by a decision making device to determine the configuration of the network of LTA vehicles. Decisions can include the number of LTA vehicles for a given mission, the configuration of each LTA vehicle within the network and the task assigned to individual LTA vehicles to name but a few possible configuration decisions.

In yet another embodiment, each LTA vehicle within the network of LTA vehicles can be controlled or programmed for autonomous or semi-autonomous missions by a remotely operated device. Given the parameters of a mission, the remotely operated device can calculate the mission parameters, transmit the mission specifications to each LTA vehicle within the network of LTA vehicles, monitor the progress of each LTA vehicle within the network of LTA vehicles, display mission status to a user and transmit changes in mission specifications to the LTA vehicles as desired.

In another embodiment, upon an occurrence of a predetermined event, the one or more LTA vehicles from the network of LTA vehicles can transition to a location for recovery or re-configuration. The location can be at the point of deployment or can be at a different location. Upon recovery, the LTA vehicle can be deflated for handling and stowage.

Additional advantages will be set forth in part in the description which follows or may be learned by practice. The advantages will be realized and attained by means of the elements and combinations particularly pointed out in the appended claims. It is to be understood that both the foregoing general description and the following detailed description are examples and explanatory only and are not restrictive, as claimed.

BRIEF DESCRIPTION OF THE DRAWINGS

The accompanying figures, not drawn to scale, which are incorporated in and constitute a part of this specification, illustrate embodiments and together with the description, serve to explain the principles of the methods and systems.

DETAILED DESCRIPTION

Figure 1:
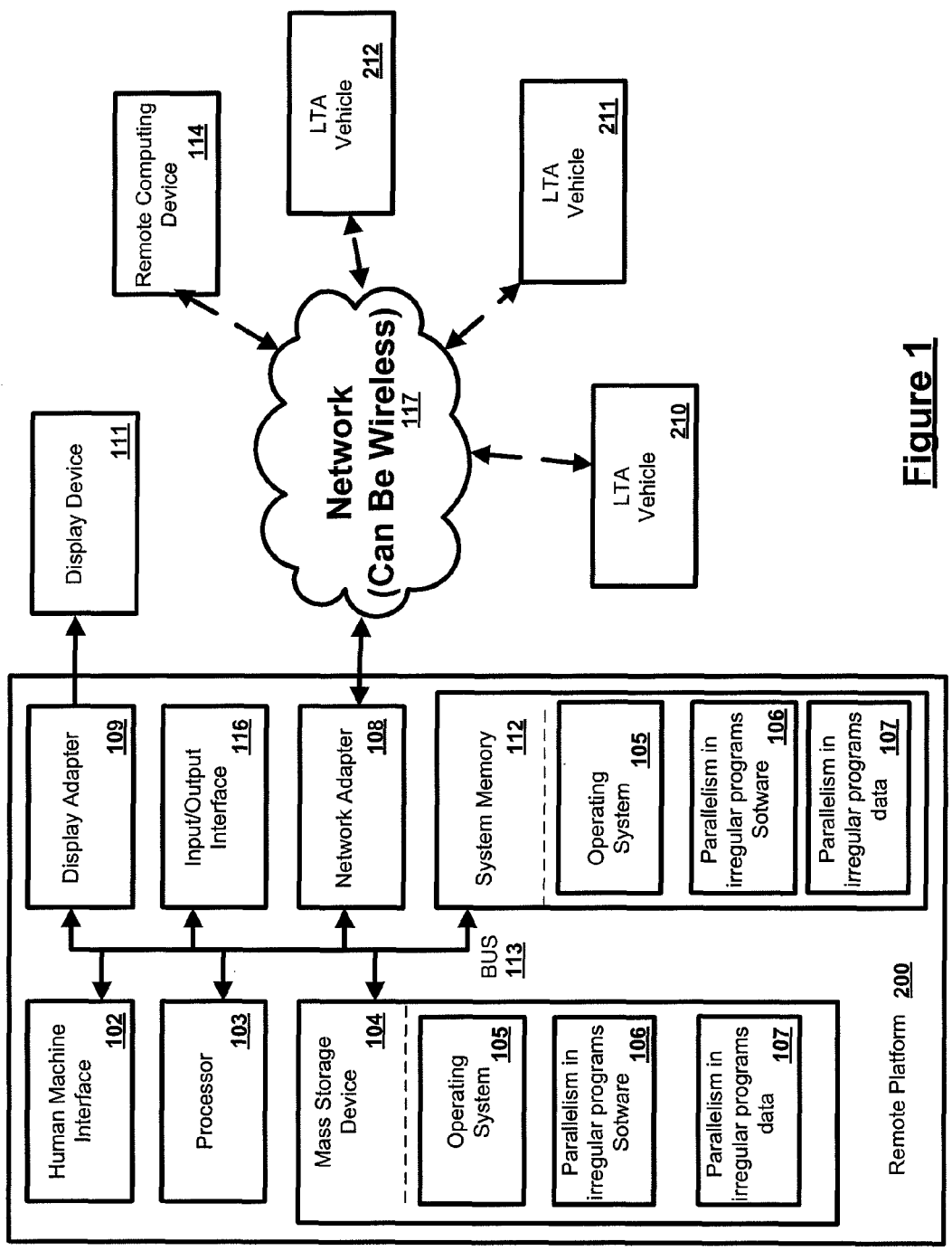
FIG. 1 is a block diagram illustrating an exemplary operating environment for performing the disclosed methods.

Embodiments of the present invention may be understood more readily by reference to the following detailed description and the examples included therein and to the figures and their previous and following description.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Exemplary Operating Environment

FIG. 1 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

Embodiments of the methods and systems described herein can be operational with numerous other general purpose or special purpose computing system environments or configurations. Examples of well known computing systems, environments, and/or configurations that can be suitable for use with embodiments of the methods and systems described herein comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that embodiments of the systems and methods disclosed herein can be implemented via a general-purpose computing device such as a computer or a remote platform 200. The components of the remote platform 200 can comprise, but are not limited to, one or more processors or processing units 103, a system memory 112, and a system bus 113 that couples various system components including the processor 103 to the system memory 112. In the case of multiple processing units 103, the system can utilize parallel computing.

According to one embodiment, as discussed in more detail below, the processor 103 can be configured to perform one or more of the operations associated with deployment, management, exploitation, reprovisioning, repositioning, recovering, replacing and redeployment of one or more LTA vehicles. For example, according to one embodiment, the processor 103 can be configured to provide mission planning options and recommendations to a user. Alternatively, or in addition, the processor 103 can be configured to control the one or more LTAs during a mission and collect data from the LTAs.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, software 106, data 107, a network adapter 108, system memory 112, an Input/Output Interface 116, a display adapter 109, a display device 111, and a human machine interface 102, can be contained within one or more remote computing devices 114 at physically separate locations, connected through buses of this form, in effect implementing a fully distributed system.

The remote platform 200 typically comprises a variety of computer readable media. Exemplary readable media can be any available media that is accessible by the remote platform 200 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data 107 and/or program modules such as operating system 105 and software 106 that are immediately accessible to and/or are presently operated on by the processing unit 103.

In another aspect, the remote platform 200 can also comprise other removable/non-removable, volatile/non-volatile computer storage media. By way of example, FIG. 1 illustrates a mass storage device 104 which can provide non-volatile storage of computer code, computer readable instructions, data structures, program modules, and other data for the remote platform 200. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and software 106. Each of the operating system 105 and software 106 (or some combination thereof) can comprise elements of the programming and the software 106.

According to one embodiment, the software 106 can include computer program instructions for instructing the processor 103 to perform one or more of the operations discussed below for mission decision making and management, and also include software instructions for simultaneously controlling one or more LTAs including deployment, management, exploitation, reprovisioning, repositioning, recovering, replacing and redeployment (collectively referred to as DMER5) either as recommendations to the user or as direct input to the vehicles. According to one embodiment, data 107 can also be stored on the mass storage device 104. The data 107 can include, for example, collected data associated with modules that comprise the system (e.g., envelope, gas, fins, propulsion mechanisms, payload, gondolas, etc.) Data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the remote platform 200 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111 can also be connected to the system bus 113 via an interface, such as a display adapter 109. It is contemplated that the remote platform 200 can have more than one display adapter 109 and the remote platform 200 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the remote platform 200 via Input/Output Interface 116.

The remote platform 200 can operate in a networked environment using logical connections to receivers and/or transceivers or computing devices of one or more lighter than air (LTA) vehicles (e.g., 210, 211, 212, etc.) or other remote computing devices 114. By way of example, a remote computing device 114 can be a personal computer, portable computer, a server, a router, a network computer, a peer device or other common network node, and so on. Logical connections between the remote platform 200 and a remote computing device or a LTA vehicle 210, 211, 212 can be made via a network 117 such as a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet.

For purposes of illustration, application programs and other executable program components such as the operating system 105 are illustrated herein as discrete blocks, although it is recognized that such programs and components reside at various times in different storage components of the computing remote platform 200, and are executed by the data processor(s) of the computer. An implementation of software 106 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems of embodiments described herein can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Overall Methods and Systems for Remotely Operated Network of LTA Vehicles

Figure 2:
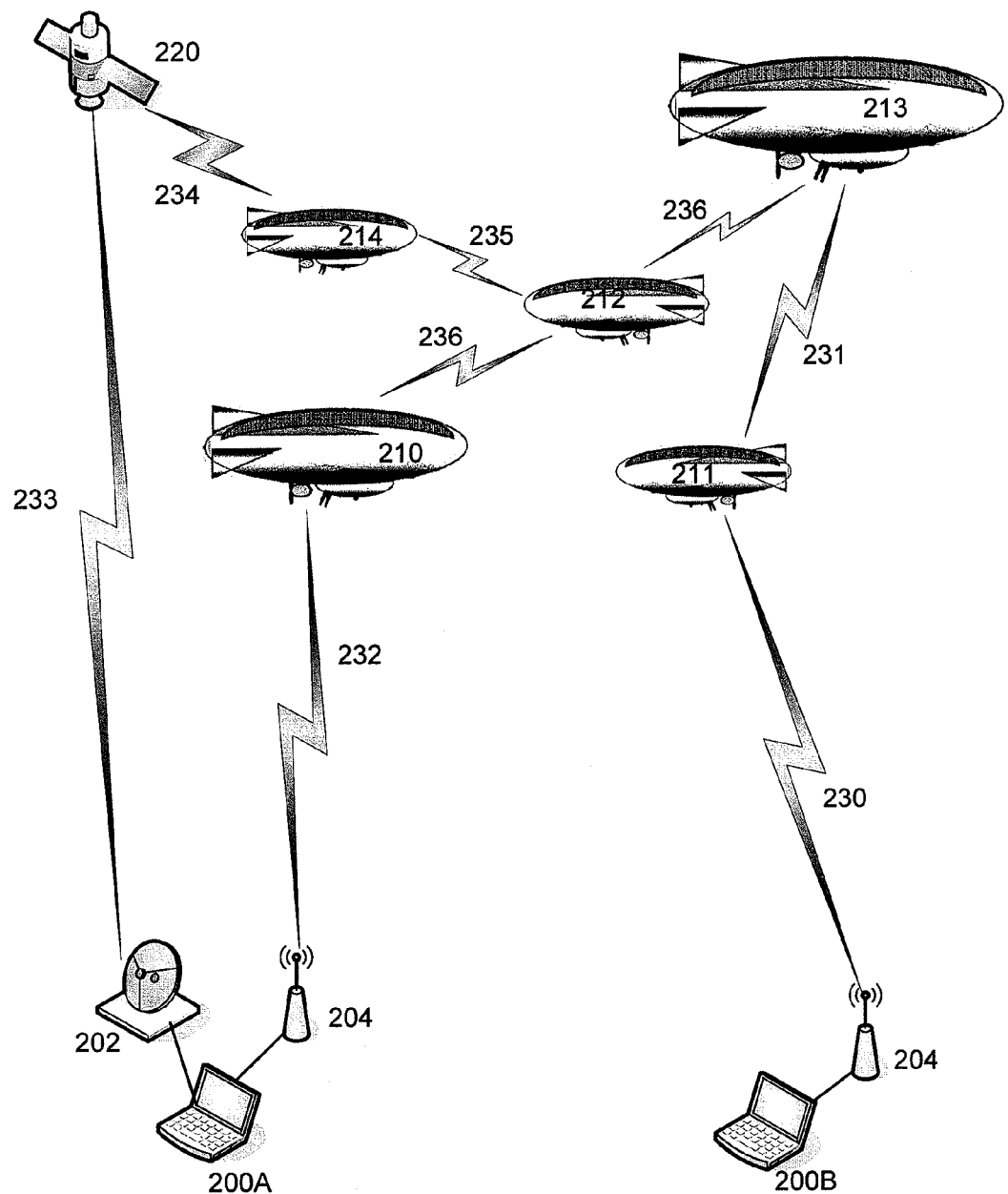
FIG. 2 is an exemplary illustration of one possible deployment scenario of the systems described herein for the remotely operated network of LTA vehicles.

The following provides an overview description of methods and systems for the remotely operated network of LTA vehicles. In one embodiment, the network of LTA vehicles can include one or more vehicles. FIG. 2 is an exemplary illustration of one possible deployment scenario of the systems described herein for the remotely operated network of LTA vehicles. The network of LTA vehicles can comprise one or a plurality of LTA vehicles 210, 211, 212, 213 and 214, as shown in FIG. 2. In this illustration, two remote platforms 200A, 200B allow users to assign mission tasks, maneuver and receive data from the LTA vehicles 210, 211, 212, 213 and 214. Communication links 230, 231, 232, 233, 234, 235 and 236 can be established by a variety of radio devices (e.g., 202, 204) as known to practitioners in the art. In one aspect, one or more deployed LTA vehicles 214 in the network of LTA vehicles can establish a communication link with one or more remote platforms 200A via a satellite link 220. Note, this illustration is but one possible configuration for the network of LTA vehicles. Other configurations can include more or fewer LTA vehicles, and more or fewer remote platforms. Additionally, communication can be through a satellite link or by radio signal independent of each other.

Modular Airship

Figure 3A:
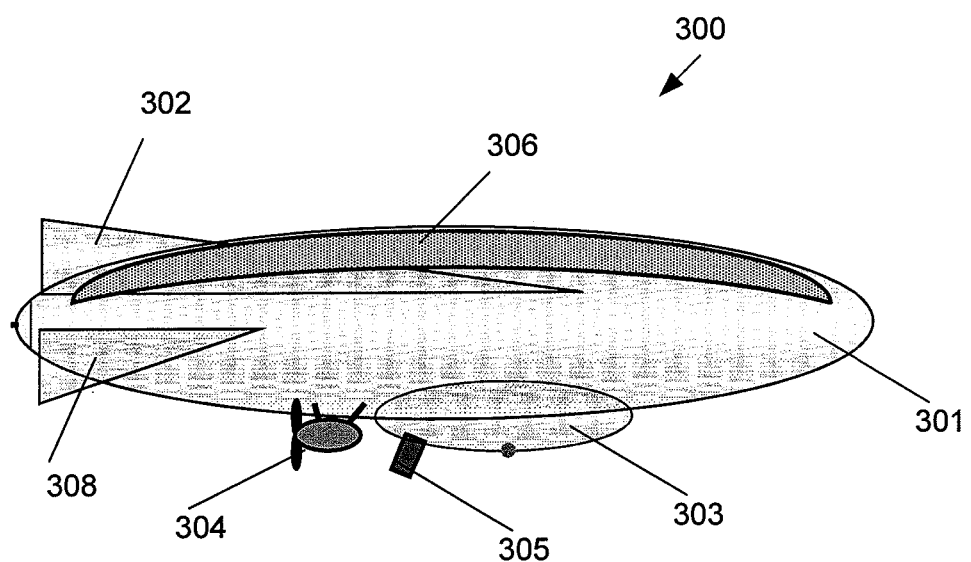
FIGS. 3A, 3B and 3C illustrate some of the possible mechanical components which can be used with the methods and systems described herein.

FIG. 3A is an exemplary illustration of a modular airship 300 that can be used to practice aspects according to embodiments of the present invention. Generally, the airship 300 is comprised of modular components including an envelope 301, fins 302, wings 308, gondola 303, and a propulsion means 304 such as an electric motor or internal combustion engine, and controls. Further comprising the airship is a gas, which is contained within the envelope. The airship 300 may also carry a payload 305 such as one or more of sensors, cameras, communications devices, weapons, etc. The airship 300 also carries one or more energy sources for the propulsion means 304 such as batteries, combustible liquids, combustible gasses, or even solar cells 306. Electrical power demands of an airship 300 can be fulfilled by small generators or batteries mounted inside the gondola, or power drawn off internal combustion engines. Power requirements are determined based at least in part on the payload and mission profile. Propulsion power requirements are based at least in part on envelope parameters and the payload and mission profile.

In one aspect, an airship can be powered by either internal combustion engine coupled to a propeller or a direct drive electric motor/propeller. The combination of engines is dependent upon the mission profile and is chosen by the user or upon accepting recommendation from mission planning software. Envelope size and time aloft, along with meteorological conditions and mission requirements, combine to determine whether or not internal combustion engines or electric motors are recommended for use. Internal combustion engine(s) can be commercially available, highly dense-power generated from diesel or gasoline, generating several to many horsepower and mounted on a gondola pod via quick release mounts to facilitate the modular character of the invention. Electric motors can be commercially available, and would be appropriately suited for smaller envelope applications because of weight to power constraints, however, in some cases, higher output electric motors could be employed, such as during operations requiring low noise, or in benign meteorological conditions. Low weight, highly dense-power batteries would be used to maintain electronic configuration until aloft and powered by the engines/motors. In one example, all power generating equipment is entered into mission planning software when the airship is configured at mission start by keyboard or by commercially available UPC-type reader that feeds directly to the software. A nominal power to size relationship series of curves is provided (for straight and level flight). When the engines are selected by the mission planning software, they are automatically "loaded" into the flight mission profile, unless the user overrides the recommendation. In one aspect, power sources are modular and conveyed in a stowage unit, in sealed housings to prevent damage to key components. After an engine is utilized, it is re-stowed after draining lines (combustion engines) or plugging into a charging device (battery engines).

Envelopes vary in size depending on payload, mission conditions and environmentals. Variables to consider in selection of an envelope size include the gas selected, weight of the propulsion means, wings, fins, gondola and payloads, since the gas, and not dynamic wing loading, provides most of the lift for the airship. Generally, the gas will be helium (He), though other gasses may be used.

Envelope fabrics are generally commercially available materials in sizes appropriate for modular, LTA vehicles and their payloads and equipment (e.g., lengths of 6, 8, 12, 20, 30 and 40 feet). Mylar (double skin—outer to protect against damage and inner as a gas barrier) fabric, rubber, or similar capability can be used to ensure the industry standard of no more than one liter per one square meter of He loss per day. In one embodiment, envelopes are configured to a 4:1 ratio and of familiar airship shape in order to maximize aerodynamic qualities and thus conserve fuel while maximizing speed.

On each side of the envelope, sleeves or lace up points can be sewn into the envelope to permit the installation of fins (or elevators) and rudders. Some envelopes can have fins that are no longer than the axially widest part of the vehicle and which are mounted at the rear of the envelope. These envelopes can be configured with integral, sewn-in "channels" that steer airflow across the shorter fins (for additional fluid across the control surface).

The envelope can be constructed of various bonded fabrics that minimize helium loss, that accommodate repeated deflation, inflation, and folded stowage, and that minimize IR detection (possible because of the differential temperature of helium to ambient). When deflated, the envelope can be collapsed to less than 1 percent of its inflated size to permit stowage. Envelopes of various sizes, for a variety of missions, environmental conditions, and payload configurations, are possible.

While smaller vehicles are generally not configured with ballonets, in order to reduce weight, larger vehicles may be ballonet-configured. The decision whether to use ballonets or not is generally mission dependent. Some envelopes can be shaped for rapid transit, and equipped with a pusher engine and propeller, while others can have a more traditional "blimp" shape and are equipped with a gondola that houses the longitudinally positioned engines/propellers.

Gondola

In one embodiment, one or more of the LTA vehicles can be assembled using one of a plurality of gondolas which can include designs that are conformal with keel, conformal with spine or non-conformal to name but a few gondola designs which are known to a practitioner in the art. The conformal gondola with spine can create stability and reduce drag for longer transit or mission periods. The conformal gondola with keel can create stability while allowing for increased maneuverability. The traditional non-conformal gondola can be used for shorter missions. While this design generally reduces weight, maneuverability can be less than that of conformal designs. The gondolas can be assembled for specialized mission, payload, environment and provide protection for electronics as well as attachment points for engines, payloads, and energy sources such as batteries. In another embodiment, the gondola can be configured with mounted cylindrical or wing-shaped (i.e. with camber) shafts perpendicular or substantially perpendicular to the vertical sides of the gondola to support one or more engines and to provide additional lift. Telescoping and non-telescoping wings or cylindrical shape shafts are contemplated for the gondola configurations. In yet another embodiment, the telescoping shafts or wings can be part of the engine thrust leverage adjustment (ETLA) components. ETLA components can permit the user to select the desired balance between a LTA vehicle's speed and maneuverability. Close in thrust (telescoping not engaged) can be selected for faster transit speed and extended shaft thrust for higher maneuverability.

Figure 3B:
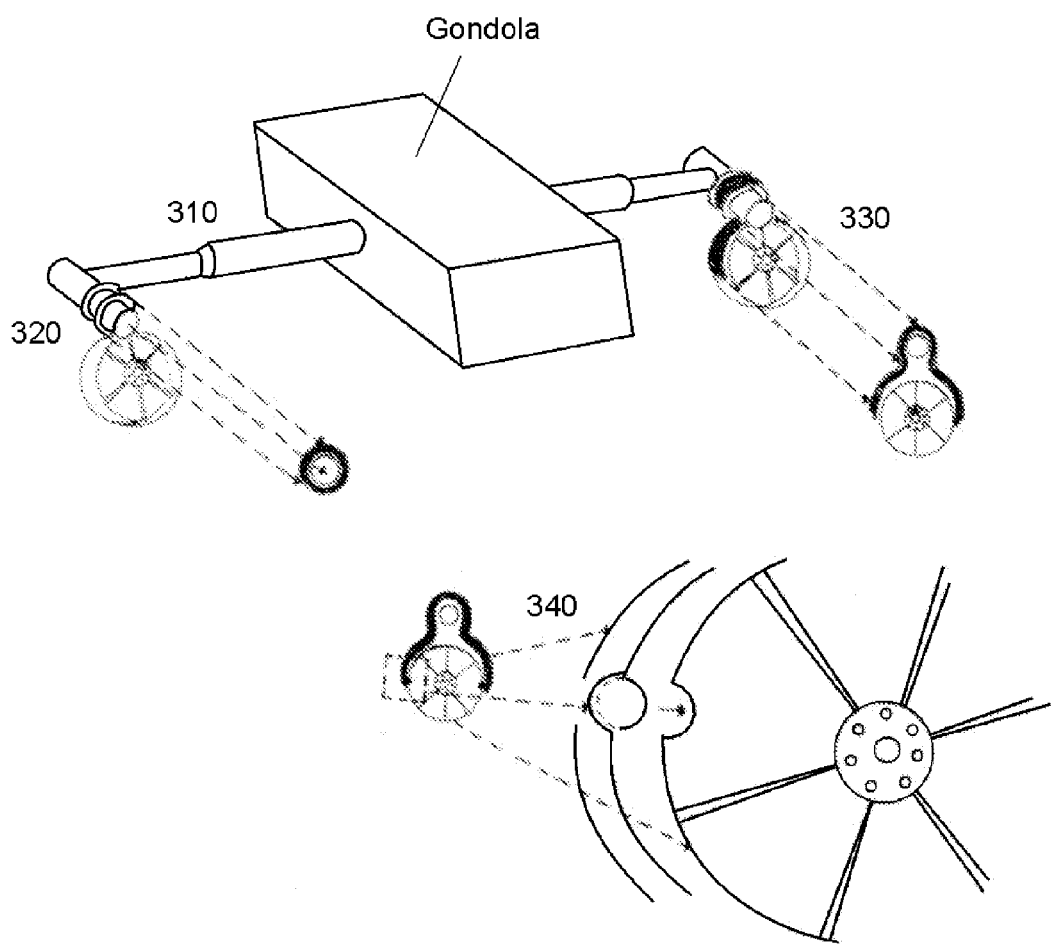

In another embodiment, internal actuators and micro-mechanical systems can be used to telescopically extend and withdraw the shaft(s). A plurality of engine attachments can be affixed to the telescoping shafts (or fixed shafts). FIG. 3B illustrates some of the possible mechanical components of engine attachments that can be used with the methods and systems described herein. These engine attachments can be mounted at a plurality of locations such as at the end of the shafts 310 or mounted in a caliper-shaped (semi-toroidal at the top, and flared at the bottom) engine attachment device (EAD), which can be connected to the shaft via a "T" strut 320. The T strut 320 can be designed with two stop sleeves between which the EAD 330 can ride. The EAD can serve to dampen main shaft 310 flexing loads which can occur at higher speeds or for larger LTA vehicles. The aftermost stop sleeve can be machined onto or permanently attached to the T strut 320 and can be configured with a short, conformal, forward-pointing lip that can ride above the EAD 330 to reduce in-flight fore-and-aft EAD swings. The forward stop sleeve can slide onto the T strut 320 and can maintain position through a variety of devices such as a frictional ball détente. The forward stop sleeve can be configured with a short, conformal, aft-pointing lip that can ride above the EAD. The two lips can be close together but do not touch. The EAD 330 can slide over the T strut 320 and ride between the two sleeves. Below the semi-toroidal section, the EAD can flare into a second semi-toroidal shape. Both sides near the bottom of this lower semi-toroidal shape can be fitted with a ball-shaped, screwless compression clasp 340. In yet another embodiment, the engine housing can be configured with concave indentations to snap into the screwless compression to hold the engine housing in place.

In one embodiment, wiring for flight control systems, power supplies, and propulsion avionics can be wired through internal channels in the shafts to the engine pods and other devices.

In another embodiment, the gondola can use fixed engine pods.

Figure 3C:
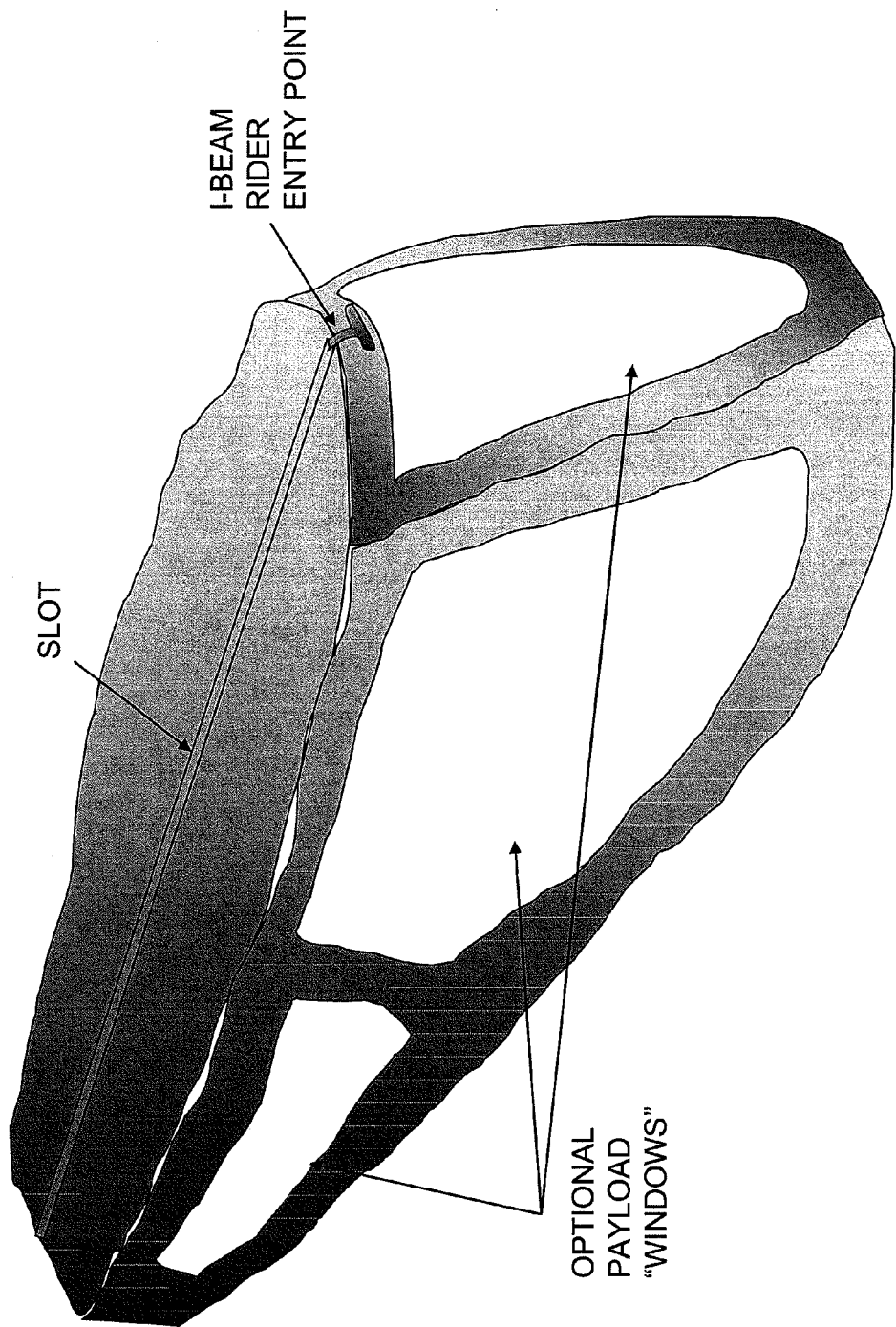

FIG. 3C illustrates an embodiment of a modular gondola and means for attaching the gondola to the envelope. In this embodiment, the gondola system is modular, and is composed of a composite or balsa I-beam frame ("gondola rider") that attaches to the envelope via multiple attachment points (sewn or bonded), as is known in the art. Multiple gondola payload pods can slide onto the I-beam and lock in place with recessed locknuts. Each pod can be configured with standard interface connectors that attach to the frame. Each payload pod can be pre-wired for power and connectivity connections. Payloads can be "plug and play" type units that can connect to the pre-wiring, and that can be secured within the pod by means of screw-type, cannon-plug or other fastening method to permit either external or internal use of the payload. Possible payloads include: communications transceivers and links, visual monitoring devices, scent monitoring devices, listening devices, hyperspectral phenomena devices, package delivery mountings, and other, specialized devices unique to the mission requirements.

Stowage and Assembly

In one embodiment, the modular design of the LTA vehicles facilitates assembly and disassembly in the field under operational conditions. Such a system can rely on a plurality of discrete parts such as accessible, differentiated, and visible stowage of envelopes, fins, elevators, rudders, gondolas, engines, electronics and payloads. In another embodiment, racks for secure helium stowage are located in the stowage system. While the methods and systems herein describe helium as the substance used to create lift, it is to be understood that other substances can be used such as hydrogen or any other substance which are known to practitioners in the art. Included in the stowage system can be the deployment and recovery components, which can comprise a reservoir, piping and compressor. These components can be selected for the size, power, and weight capability of the transport vehicle or personnel. Stowage systems can be manufactured from machined and welded metal, blown plastic, or use dividers and storage cubics for an existing space. In one embodiment, the stowage system can be assembled onto a mobile vehicle, allowing for deployment and retrieval at different location. In another embodiment, the stowage system can be assembled at a fixed location. In yet another embodiment, the stowage system can be assembled for man-deployable transport by one or more persons.

For example, in one deployment scenario, helium ("He") gas is taken from a series of rack-mounted cylinders (which are sized for type of transport unit and number of possible envelopes) and used to inflate the mission-appropriate envelope(s). As the envelope approaches, for example, 90 percent full, a contact switch is activated and the fill ceases. The vehicle then flies its mission. When it returns, the recovery valve (which can be sewn into the envelope) is connected to a fitting that is piped to a reservoir and compressor. The envelope can be configured with this fitting to permit the quick recovery of the helium lifting gas (e.g. a Rapid Recovery System (RRS)). The fitting allows for quick deflation, especially if, for operational or technical reasons, the helium is not to be recovered. Under most operational circumstances, however, helium, a relatively expensive and non-renewable resource, is recaptured. After vehicle recovery, the RRS can be mated to a valve on the compressor that opens the fitting. Once the connection is made, the compressor is activated and draws a vacuum, allowing the He to "dump" into the reservoir at the maximum compression rate. When the reservoir is filled, a switch is activated that closes the fitting to prevent the loss. The compressor takes suction on the reservoir and the helium is compressed to industry standards for gas cylinder storage and piped into the storage cylinders. As the reservoir reaches for example 70 percent of capacity, the fitting is reopened, which empties more He into the reservoir. The cycle is repeated until the envelope is empty. The system can be programmed using hardware and software that recognizes the size of the envelope so that once the envelope dump valve is connected to the reservoir, the operation essentially is hands off.

Figure 4:
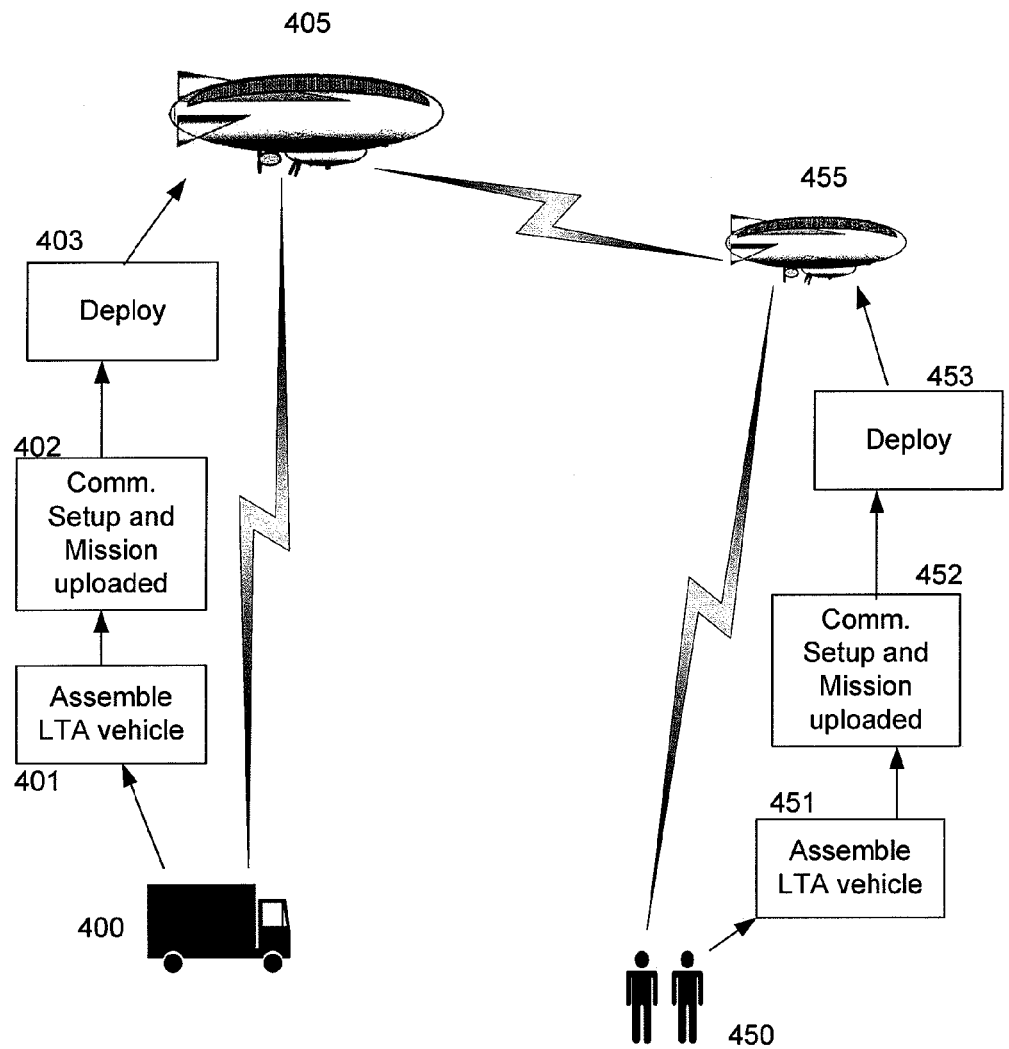
FIG. 4 illustrates an exemplary deployment of a network of LTA vehicles from multiple mobile platforms.

FIG. 4 illustrates an exemplary deployment of a network of LTA vehicles from multiple mobile platforms. In step 401, a user on or from mobile platform 400 assembles LTA vehicle 405 from modular components stored on the mobile platform 400 based on desirable characteristics. In step 402, the LTA vehicle's electronics are configured, communication with a remote controller device is established and the mission specifications are uploaded into the LTA vehicle 405. In step 403, the LTA vehicle 405 is deployed and travels to the mission location. At a separate location, mobile platform 450, in step 451, assembles another LTA vehicle 455 from modular components stored on the mobile platform 450 based on desirable characteristics. In step 452, the LTA vehicle's 450 electronics are configured, communication with a remote controller device is established and the mission specifications (which can but does not have to be the same mission as that of LTA vehicle 405) are uploaded into the LTA vehicle 450. In step 453, the LTA vehicle 455 is deployed and travels to the mission location. In one embodiment, the two LTA vehicles, 405, 455 can perform independent of each other, acting as a separate network. In another embodiment, the two LTA vehicles, 405, 455 can establish a communication link, creating a common network.

Controller Devices

Figure 5:
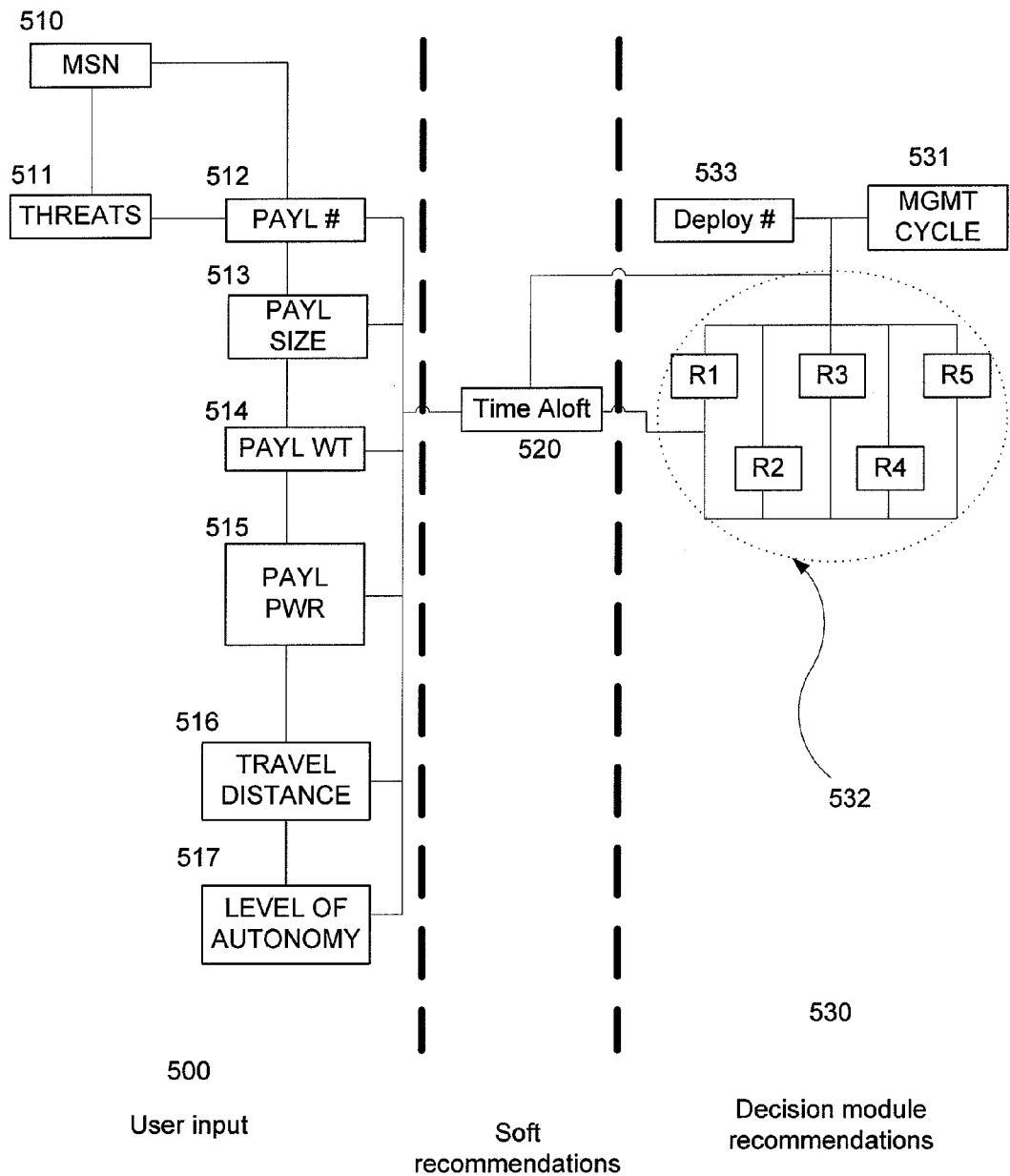
FIG. 5 illustrates the functions and flow of the decision module. In step 500, mission specific inputs are entered.

In one embodiment, a decision module can receive from one or more users, data such as mission choice, potential threats, environmental factors, payload information (size, weight, power requirements, etc.), mission specific information, aloft time, deception intention, probing intention, target area, and platform distribution area, etc. From this information, the decision module can recommend the number of LTA vehicles to employ for the network of LTA vehicles. In yet another embodiment, the decision module can recommend one or more modular components to be assembled to create one or more mission specific LTA vehicles. FIG. 5 illustrates the functions and flow of the decision module. In step 500, mission specific inputs are entered. These inputs can include information such as, but not limited to, mission identification 510, types of threats 511, number of payloads 512, sizes of payloads 513, payload weight 514, payload power requirements 515, travel distance 516 and level of autonomy 517. In another embodiment, the user can define single or multiple missions in either cooperative or non-cooperative environments. In yet another embodiment, in step 520, the decision module can make recommendations concerning the time aloft. In one embodiment, this recommendation can be overridden by the operator. In yet another embodiment, in step 530, the decision module calculates and recommends the number of LTA vehicles to be deployed 533 for the given mission(s), the type of management for the plurality of LTA vehicles to be deployed 531, and the configuration of each LTA vehicle in the network of LTA vehicles 532. In another embodiment, one or more of these recommendations can be overridden by the operator.

The network of LTA vehicles can be remotely controlled through a remote platform 200 such as the one described in FIG. 1. In one embodiment, the remote platform or controller device 200 can assist in a plurality of tasks. For example, the tasks can include, but are not limited to, deployment (the placing in service, launch or dispatching of vehicles), in-flight management (processing data necessary to determine parameters such as spatial and temporal constraints and exploiting tactical circumstances, and transmitting said parameters to the LTA vehicles for execution), exploitation of assets based on obtained data (retrieving and processing data obtained from the network of LTA vehicles wherein the processing can include the employment of databases, taxonomies, ontologies, synthesis, hypothesis generation, experts, doctrines and theories), updating provision requirements for the LTA vehicles (determining additional resources needed to sustain or increase the time, range, or operational capabilities of one or more LTA vehicles), repositioning the LTA vehicles, recovering the LTA vehicles (return the one or more LTA vehicles to a location for retrieval, stowage, repair, payload change, etc.). In one embodiment, the controller device 200 can be designed specifically to operate with the LTA vehicle network. In another embodiment, by utilizing a common command structure, the remote controller device can be designed to support a plurality of systems including other unmanned systems such as heavier than air flight vehicles, ground vehicles, or unmanned surveillance systems to name but a few.

Figure 6:
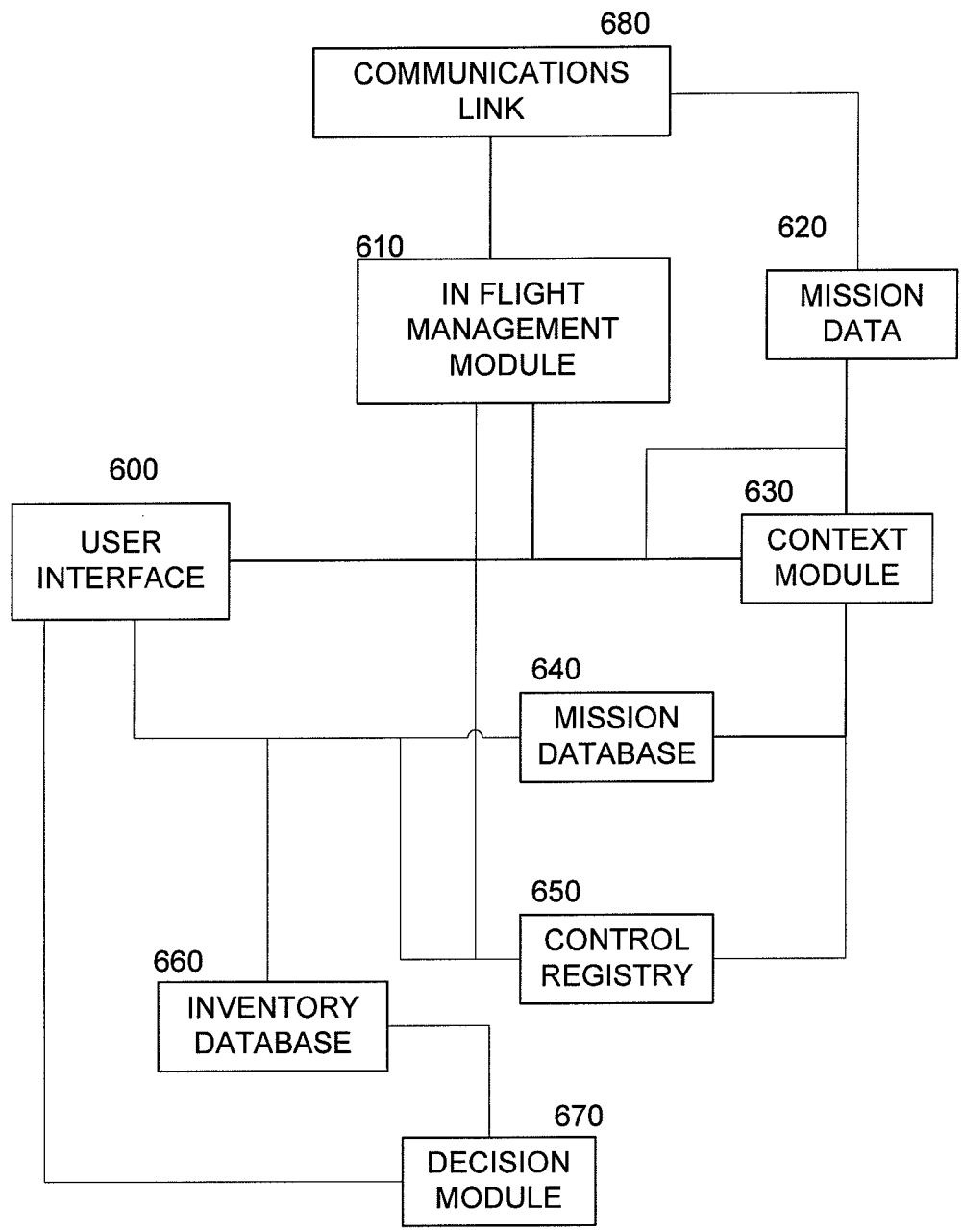
FIG. 6 illustrates an exemplary diagram of some components of an embodiment of a remote controller device.

FIG. 6 illustrates an exemplary diagram of some components of the remote controller device 200. In this example, the decision module 670 and context module 630 are included as part of the remote controller device 200. It is to be noted that it is not a requirement that the decision module 670 and context module 630 be integrated into the remote controller device 200 for the methods and systems described here in to work. In other embodiments, either module or both modules can be separate from the remote controller device 200. When the context module 630 is a separate unit, communication between the remote controller device 200 and the context module 630 can be operably achieved through numerous methods known to practitioners in the art. In FIG. 6, the decision module 670 calculates and recommends the number of LTA vehicles and the specifications for each of the LTA vehicles based on information provided through the user interface 600 and the modular components available in the inventory database 660. The context module 630, receives mission data 620 from the one or more LTA vehicles through the communication link 680. The communication link 680 can comprise one or more methods of communication, known to practitioners in the art, with the one or more LTA vehicle. For example, milspec or commercial radios, or satellite transceivers can be used. The context module 630 can examine and evaluate the mission data 620 for desirable events corresponding to events in the mission database 640. When a desirable event is detected, the context module 630 can make recommendations to the user interface 600 for further action, or can issue instructions to the one or more LTA vehicle(s) based on information in the mission database 640. The control registry 650 maintains a database for each LTA vehicle deployed. The control registry can contain information such as vehicle identification number, payload, and level of autonomy. The context module 630 can examine the control registry 650 to determine if user interaction is desirable when issuing instructions to the one or more LTA vehicle. In one embodiment, when the level of autonomy is set to fully autonomous, meaning the one or more LTA vehicle(s) is operating fully autonomous from the remote controller device, the context module 630 may issue overriding instructions to the one or more LTA vehicle(s) if a desirable event occurs as defined by the mission database 640. When the one or more LTA vehicle(s) is under the direct control of an operator, the context module can notify the user interface 600 of the occurrence of a desirable event. In semi-autonomous mode, some events can require the notification of the user interface 600, while others can result in the context module 630 issuing instructions to the one or more LTA vehicle via the in flight management module 610. The in flight management module 610 can receive high level commands from the user interface 600 and the context module 630. The in flight management module translates the high level commands into scripts containing individualized commands for the one or more LTA vehicles and for the payloads on said one or more LTA vehicles. These individualized commands can be passed to the communication link 680 for transmission to the one or more LTA vehicle(s). The user interface 600 can be used to enter mission related information such as mission specific requirements, availability of modular components, and environmental data. The user interface 600 can also be used to review mission data, review context module 630 recommendations, override said recommendations, and issue high and low level commands to the one or more LTA vehicle.

Note, the decision module 670 can be embedded within the controller device 200. However, it is contemplated that the decision module 670 can be a stand-alone device or can be incorporated into other computational devices.

In another embodiment, the context module 630 can be embedded into the one or more LTA vehicles allowing for autonomous response to a plurality of desirable events without receiving updated commands from the remote controller device 200.

In yet another embodiment, in employing a distributed and networked constellation of LTA vehicles (possibly linked with other manned or unmanned units), the controller device 200 can be part of an engineering design that takes a comprehensive approach to integration of sensor deployment and data analysis. System engineering for the distributed, networked LTA vehicles can include the value of the information as well as the type of decisions that a user might make.

In one embodiment, a context module 630 can assist the user in gathering, moving, processing, acting upon and protecting information The context module 630 can process data relating to the one or more LTA vehicles in the network of LTA vehicles using a combination of heuristics, ontologies, tags, semantic technologies, AI, and/or look-up tables and can determine whether the data warrants a desirable action. Actions can include, but are not limited to, exploration, exploitation or abandonment. Continued exploration can mean that no changes to the mission or variables will occur, although users are able to adjust parameters if desired, to permit deeper, broader, or different sensor exploration. If either the user or the context module 630 (via the data processing tools described herein) determine a desire to shift exploitation, vehicles can be recalled or repositioned, or additional vehicles and payloads deployed. Exploiting information gained in the relatively near term could mean: delivery of a payload (by another vehicle or unrelated system), employment of human capability, or employment of a different machine capability. Another option can be abandonment of the mission, geography, or discrete mission variables. Abandonment can be determined by either parameters being met or based on user decision. In the case of geographic abandonment, the remote controller device can prompt the user for a new location and new sensor initiation input, or the controller device can send the vehicle to a secondary location.

In one embodiment, mission variables can be established and parameters can be set in the remote controller device prior to starting the mission. These variables can perform the tasks of deployment, management, exploitation, reprovisioning, repositioning, recovering, replacing and redeployment (collectively referred to as DMER5) either as recommendations to the user or as direct input to the vehicles.

In one embodiment DMER5 describes some types of interaction between user, the remote controller device, and the one or more LTA vehicles within the network of vehicles:

a. Deployment: As described herein, this can comprise establishing variables and parameterizing them, synchronizing the vehicle, payload and controller device, assembling the vehicle, attaching the payload, inflating the envelope, and either sending the vehicle aloft or grounding it for a delayed aloft.

b. Management: Vehicle management can comprise determining if any LTA vehicles within the network of LTA vehicles are out of position, not reporting or responding, or determining if additional vehicles are needed given the sensor feedback or user input during the mission. This can be determined by feedback from the LTA vehicles within the network of LTA vehicles reporting location in 4 dimensions, coupled with a Context Module input and processing that either the controller device or the user can leverage to make decisions on the effectiveness of the current number and location of vehicles and payloads.

c. Exploitation: Sensor data from vehicles can be fed either by direct line of sight or satellite datalink, or via the external network, to the Context Module of the controller device.

d. Reprovisioning: Should an LTA vehicle require fuel (battery expenditure or hydrocarbon-based fuel exhaustion) or additional sensing capability, it can alert the controller device, returning to a location where the vehicle can be refueled.

e. Repositioning: The amount of human interaction can determine whether or not repositioning occurs autonomously or with user input. The vehicle can alert the controller device that repositioning is recommended under a plurality of conditions. For example, when sensor data is nil, when sensor signal strength is weak, sensor field is occluded or obscured, when target moves out of sensor field, when an LTA vehicle is configured with multiple phenomena sensors and one sensor's data is prioritized over other sensors requiring repositioning, or when weather or other environmental conditions are outside or will become outside vehicle operational boundaries.

f. Recovering: The controller device can alert the user as the mission end time is approaching, to facilitate readiness for recovery and stowage. The user can have the option of extending the mission, depending on time-distance-speed-fuel calculations.

g. Replacing: The controller device can alert the user to begin preparing a new vehicle and payload, if an existing payload is non-responsive (inadvertent network departure or communications failure, flight failure, sensor failure, or either user desire or controller device recommendation for different payload aloft).

h. Redeploying: The controller device can "partition" functionality to be able to begin the variable selection, parameter choice, and synchronization with a recovered vehicle, while still providing DMER5 for the existing vehicle(s).

In another embodiment, the degree of human interaction with the Context Module can be dependent on the mission, scenario, priority, and urgency. With a higher degree of human interaction, the Context Module feedback can be downloaded to permit larger display of multiple phenomenological data, which can be convenient for a plurality of ships. In the case of less human interaction, such as for monitoring or when post-mission analysis will be performed, the Context Module itself receives the feedback, and provides constellation management in accordance with the parameterized variables established prior to mission start.

In yet another embodiment, the remote controller device can communicate with the network of LTA vehicles and payloads via a commercial or milspec VHF, UHF or satellite communications antenna and transceiver. The controller device can allow the user to input data about the mission, platform(s), payload(s), and context (meteorological environment, threat, etc.), to make changes to the operational schema, and to allow the user to view and download/record data and information from the sensing or communications packages mounted on the platform. The controller device can manage both vehicle and payload capabilities in either an integrated or independent manner. Payload sensing or communications requirements can be permitted to drive the vehicle or the vehicle and payload can be operated as independent entities. In one embodiment, the remote controller device can interface with the user to provide decision making assistance. This can be done via an algorithm that includes a plurality of factors. For example, factors can include deployment information, management information, exploitation (of data by the user) information, repositioning information, reprovisioning information, recovering information, redeploying and replacing of vehicles. The algorithm can include the context as reported by sensors, the mission as defined by the user, the decision maker as defined by the user, and the decisions that the user makes. The inputs can be fed into software that can examine each type of sensor across an "explore, exploit, or abandon" matrix established by the user.

In another embodiment, while the one or more LTA vehicles within the network of vehicles are in communication with the user, the user can select one of a plurality of default modes for when communication is broken. Default modes can specify the actions that a LTA vehicle can perform should communication be lost with the user. For example, when communication is lost, a LTA vehicle can default to a predefined script which can include instructions such as repositioning to a location where communication was previously established and request the user for further instructions. Alternatively, the vehicle can default to a predefined script which can include instructions to complete or partially complete the previously assigned task or switch to a new task, or include commands to transition to a coordinate location and wait for further instructions. Additionally, the default mode can comprise of a combination of any of the above scripts and can also include other scripts known to a practitioner in the art.

Figure 7A:
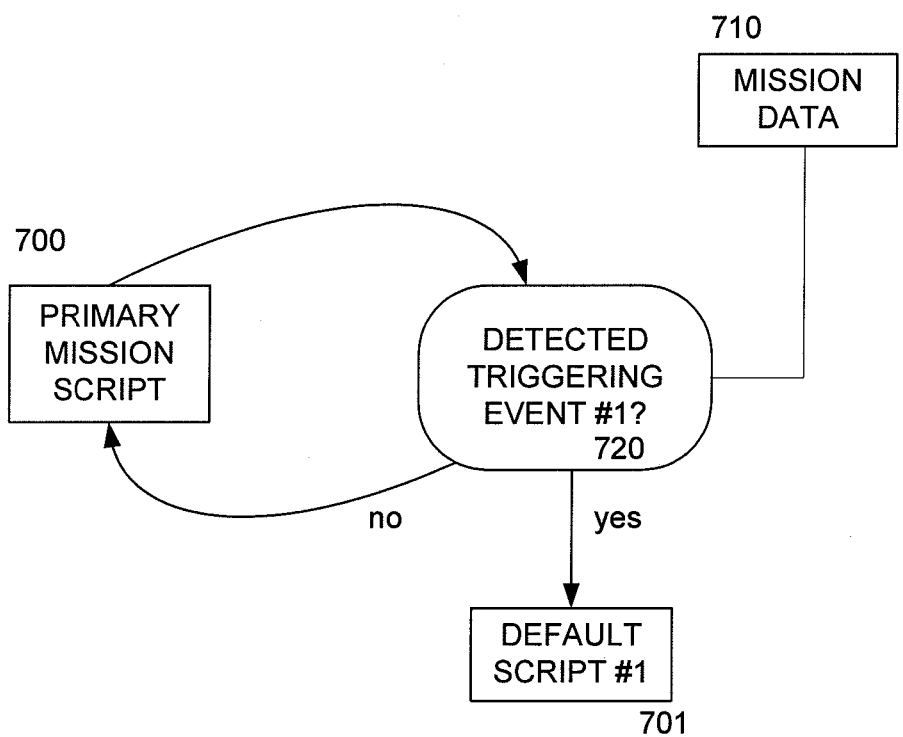
FIGS. 7A, 7B, and 7C illustrates exemplary algorithms for the default modes.
Figure 7B:
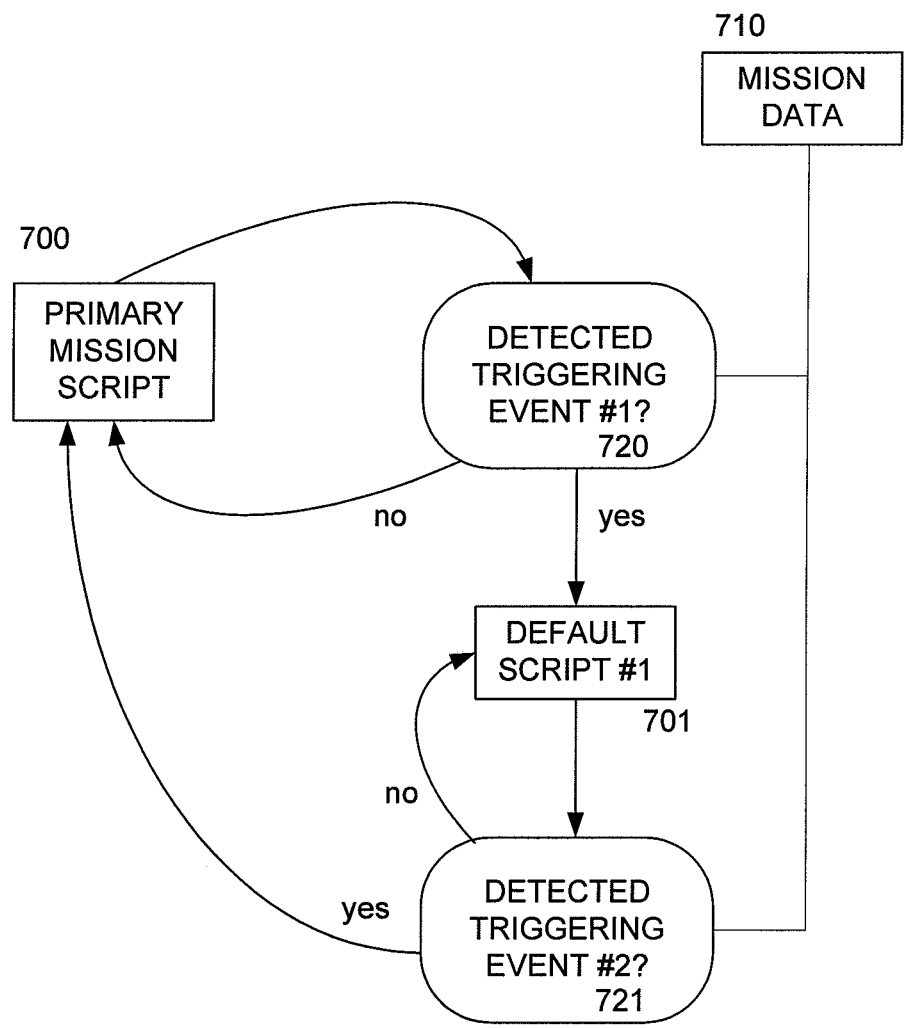
Figure 7C:
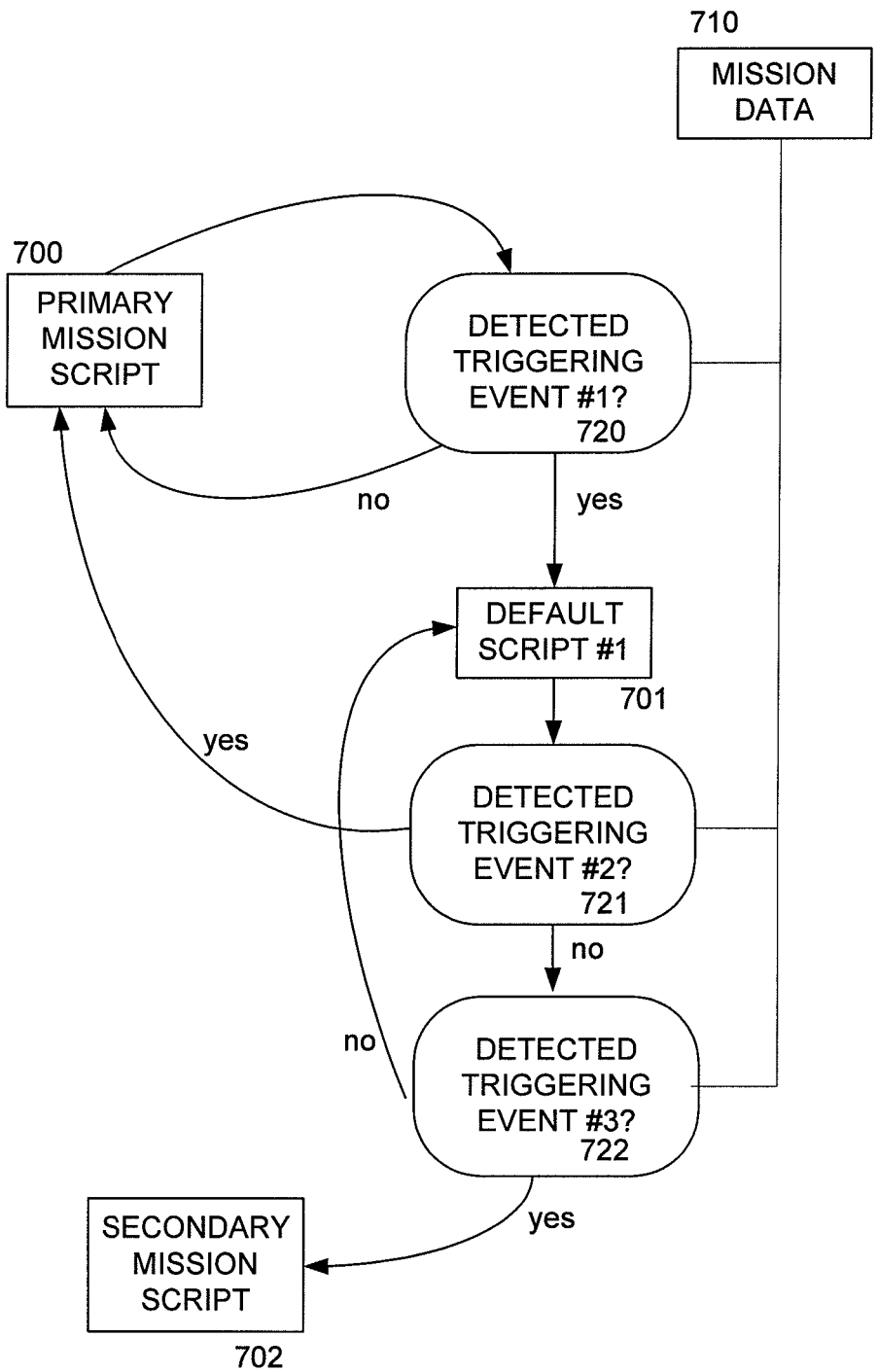

FIGS. 7A, 7B, and 7C illustrate exemplary algorithms for the default modes. These algorithms can be operably loaded into the one or more LTA vehicles or can be part of the context module. In FIG. 7A, a LTA vehicle follows the primary mission script 700 until a triggering event 720 as defined by the mission data 710 is detected. Upon detection of the triggering event 720, the LTA vehicle switches to a default script 701. Each script can comprise of one or more sets of instructions for the LTA vehicle and for related payloads. In FIG. 7B, a LTA vehicle follows the primary mission script 700 until a triggering event 720 as defined by the mission data 701 is detected. Upon detection of the triggering event 720, the LTA vehicle switches to a default script 701. Upon detection of a second triggering event 721, the LTA vehicle switches from the default script 701 to the primary mission script 700. In FIG. 7C, a LTA vehicle follows the primary script 700 until a triggering event 720 as defined by the mission data 701 is detected. Upon detection of the triggering event 720, the LTA vehicle switches to a default script 701. Upon detection of a second triggering event 721, the LTA vehicle switches from the default script 701 to the primary mission script 700. Upon detection of a third triggering event 722, the LTA vehicle can switch from the default script 701 to a secondary mission script 702. Note, FIGS. 7A, 7B and 7C illustrate but three examples of a plurality of possible algorithms for controlling the one or more LTA vehicles.

Figure 8:
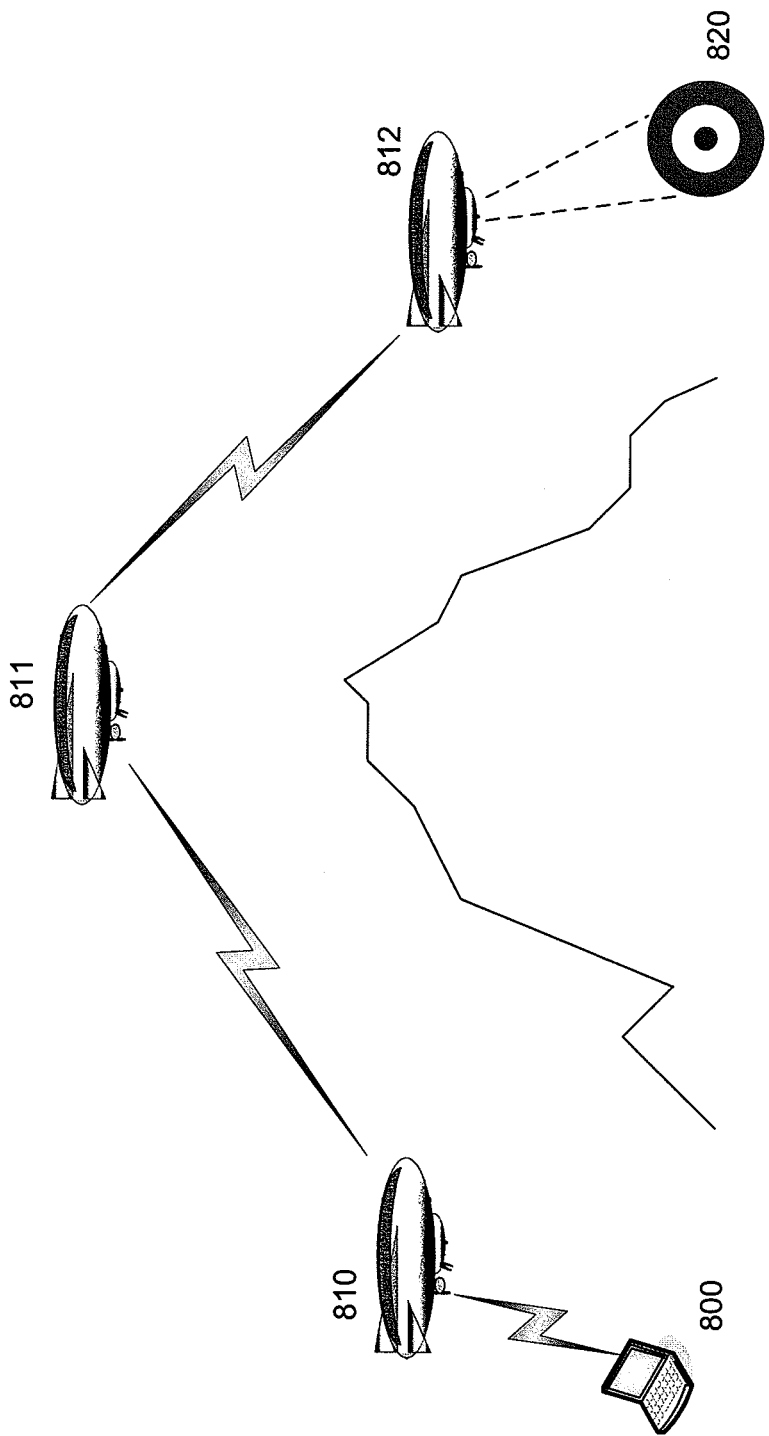
FIG. 8 illustrates an example of the network of LTA vehicles being used to increase distance in a communication link.

It is also contemplated that the network of LTA vehicles can be deployed as communication relays for remote LTA vehicles to the user such that LTA vehicles that would otherwise be out of communication range can maintain a communication link with the user. FIG. 8 illustrates an example of the network of LTA vehicles being used to increase distance in a communication link. In FIG. 8, the location of the mission target 820 is outside of the line of sight necessary for some forms of remote communication. In one embodiment, the LTA vehicle 812 and the remote controller 800 can use a different communication method such as satellite transceivers. In another embodiment, a network of LTA vehicles can be deployed. In this embodiment, LTA vehicles 811 and 810 can be deployed to act as communication relay stations from LTA 812 to the remote controller device 800.

In one embodiment the controller device and network of LTA vehicles can be configured to join an existing network and to perform vehicle/payload management via that network. They can also be configured to help a user set up network, with the remote controller device and network of LTA vehicles establishing the local network. The networking set-up process can be accomplished prior to deployment of any vehicle. In another embodiment, a single vehicle can be deployed with either direct remote control or preprogrammed flight as the means of control without a local or external network established.

The remote controller device can be synched with the communications payload mounted to an LTA vehicle within the network of LTA vehicles. This can be accomplished by commercially available network interface devices or through milspec devices. Through the interface, the vehicle can be assigned a plurality of identifiers. For example, identifiers can include a unique identifier, a mission number, a mission profile, a payload package identifier (multiple payloads may be identified individually or as a group) and a type of control (man-in-the-loop remote control, pre-programmed waypaths, autonomous). The type of control can be accomplished by commercially available or milspec flight control systems that interface with the vehicle's flight controls. The remote controller device and LTA vehicles can acknowledge each other, as well as any external network, or device in a network, that is to be joined. When the mission specifications have been communicated to the LTA vehicles, the vehicles can report that they are ready for deployment. Deployment can include inflating the vehicles and deployment at that time or set up for delayed inflation and deployment. Either vertical launch or direct-to-waypoint launch options can be available.

At mission complete, the user can sign off the remote controller device from the network, deflate the envelope and, if helium is being used, recover the lifting gas, disassemble the components, and stow them. The data in the controller device can be downloaded for additional, detailed post-mission analysis.

Once deployed, the vehicle(s) can fly to their initial programmed location in three dimensions (coordinates plus altitude), and then can "enter" an external network, or can establish a new network connection with other vehicles and the controller device.

The controller device can signal the vehicle to initiate sensor turn on. The sensor(s) is (are) aligned relative to the vehicle position (forward, aft, starboard, port, up, down), and then stowed until the vehicle arrives at the designated sensing point (identified in advance or on-the-fly by the operator).

In one embodiment, while in flight, the controller device can receive information from the vehicles based on a plurality of algorithms. For example, communication with each LTA within the network of LTAs can be on a round-robin schedule, on a priority basis, or based on mission specific criteria to name but a few possible algorithms. Communication can occur directly if line of sight between the controller device and a vehicle within the network of LTA vehicles is established, or, if non-line of sight communications are active, via the pre-established network. Communications can comprise of continual update of management, exploitation, reprovisioning, repositioning, recovering, replacing, and redeploying data.

Managing a Network of LTA Vehicles

In one embodiment, when more than one vehicle is aloft, the controller device management module can receive regular updates on fuel status, communications, and 4-D (three physical dimensions, plus time) location (in addition to the sensor inputs that are fed to the Context module). The management module can contain an optimization algorithm that determines location, status, and fuel status in relation to the deploying unit, and can direct the unit to return on its own to a location or can alert the user to recall the unit in order to service or refuel it. As multiple vehicles carrying multiple-phenomena sensing capability report to the Context module, the controller device can adjust individual or multiple vehicles in the network of LTA vehicles to keep a target "in focus." The user can direct the controller device to alert the network of LTA vehicles to changes in the deploying unit status, such that the constellation input to the Context and Management modules can update accordingly. For example, a deploying unit that was going to move to a new location may need to relocate the network of LTA vehicles, or may need to refuel vehicles or may simply need to transmit data to the vehicles as to the new location (for recovery, etc.).

Mission Controls

In one embodiment, LTA vehicles can be controlled by a plurality of methods. For example, remote control (joystick with video feed), preprogrammed autopilot, in-flight GPS waypoint navigation, or semi-autonomous methods can be used. Semi-autonomous vehicles can launch then transit, or transit on a direct flight path to an initial waypoint and then respond to a non-linear or fuzzy algorithm that takes input from the sensors and user communications with either the LTA vehicle or the network of LTA vehicles entered to optimally position the LTA vehicle with respect to the target of interest. Users can select, on the fly, the type of control. A procedure known to practitioners in the art, it can involve overriding the current type of control by selecting the specific vehicle identifier and ordering a new type with appropriate commands. Selecting between control types can be accomplished via the remote controller device interface or voice-activated interface which can relay the method of control to the LTA vehicle(s). LTA vehicles can be directed by these means or by drag-and-drop mapping tools that are readily available.

The examples described herein are put forth so as to provide those of ordinary skill in the art with a complete disclosure and description of how the systems and/or methods of embodiments described herein are designed and evaluated, and are intended to be purely exemplary and are not intended to limit the scope of the methods and systems.

While the methods and systems have been described in connection with embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit of embodiments described herein. Other embodiments will be apparent to those skilled in the art from consideration of the specification and practice disclosed herein. It is intended that the specification and examples be considered as examples only, with a true scope and spirit being indicated by the claims at the end of this specification.

The invention claimed is:

1. A method for managing a network of lighter than air (LTA) vehicles comprising:
   determining desired components for a first mission;
   assembling one or more LTA vehicles from the desired components wherein assembly is performed from a mobile platform;
   programming the one or more LTA vehicles from a network of LTA vehicles;
   deploying the one or more LTA vehicles from the network of LTA vehicles;
   monitoring the one or more LTA vehicle from the network of LTA vehicles;
   exploiting payload data from the one or more LTA vehicles from the network of LTA vehicles;
   reprovisioning the one or more LTA vehicles from the network of LTA vehicles;
   repositioning the one or more LTA vehicles from the network of LTA vehicles;
   retrieving the one or more LTA vehicles from the network of LTA vehicles;

stowing the one or more LTA vehicles from the network of LTA vehicles; and re-determining desired components for a second mission;

wherein the determining of the desired components and the re-determining of the desired components comprises selecting desired components from a plurality of modular components, and wherein selecting desired components from a plurality of modular components comprises:

selecting an envelope based on gas selected and payload requirements from among a plurality of different sized envelopes;

selecting fins from among a plurality of fins;

selecting wings from among a plurality of wings;

selecting a gondola based on mission length and stability and maneuverability, requirements from among a conformal gondola with keel, a conformal gondola pith spine, and a non-conformal gondola; and selecting a propulsion means based on mission noise and payload requirements from among an internal combustion engine and an electric motor.

2. The method of claim 1, wherein managing the network of LTA vehicles comprise using a controller device remote to the network of LTA vehicles.

3. The method of claim 1, wherein selecting the desired components from the plurality of modular components comprises:

storing the plurality of modular components on the mobile platform;

receiving, by a computer, a plurality of mission parameters; and determining, by the computer, based on the plurality of mission parameters modular components to be assembled into the one or more LTA vehicle.

4. The method of claim 1, wherein determining the desired components comprises:

entering by an operator, the plurality of mission parameters;

determining, based on the plurality of mission parameters, the desirable number of LTA vehicles to be utilized in the network of LTA vehicles; and determining, based on the plurality of mission parameters, the desirable combination of modular components for each of the one or more LTA vehicles within the network of LTA vehicles.

5. The method of claim 1, wherein programming the one or more LTA vehicles from the network of LTA vehicles comprises programming the one or more LTA vehicles from a remotely operable device.

6. The method of claim 1, wherein deploying the one or more LTA vehicles from the network of LTA vehicles comprises:

inflating an envelope of the one or more LTA vehicles with a lifting substance stored with the remote platform;

powering up the one or more LTA vehicles;

establishing a communication link between the one or more LTA vehicles and the remote controller device; and releasing the one or more LTA vehicles for take off.

7. The method of claim 1, wherein the monitoring the one or more LTA vehicle from the network of LTA vehicles comprises:

maintaining the communication link between the remote controller device and the one or more LTA vehicles;

requesting, by the remote controller device, data from the one or more LTA vehicles; and receiving, by the remote controller device, data from the one or more LTA vehicles.

8. The method of claim 1, wherein exploiting the payload data from the one or more LTA vehicles from the network of LTA vehicles comprises:

analyzing payload data to identify a desirable event;

notifying the user of the desirable event; and modifying mission parameters of the one or more LTA vehicles based on the occurrence of the desirable event.

9. The method of claim 1, wherein reprovisioning the one or more LTA vehicles from the network of LTA vehicles comprises:

determining a level of provisions accessible to the one or more LTA vehicles;

calculating a level of provisions desirable for the one or more LTA vehicles to complete an assigned mission;

determining a desirable location where the one or more LTA vehicles can rendezvous with a mobile stowage platform;

instructing the one or more LTA vehicles to traverse to the desirable location;

instructing the mobile stowage platform to traverse to the desirable location;

establishing operable connection between the one or more LTA vehicles and the mobile stowage platform; and replenishing the provisions to a desirable level.

10. The method of claim 1, wherein repositioning the one or more LTA vehicles from the network of LTA vehicles comprises:

determining that a new location is desirable for the one or more LTA vehicles; and communicating, by the remote controller device, the new location to the one or more LTA vehicles.

11. The method of claim 1, wherein retrieving the one or more LTA vehicles from the network of LTA vehicles comprises:

rendezvousing, by the one or more LTA vehicles, with the mobile platform; and landing, by the one or more LTA vehicles, approximate to the mobile platform.

12. The method of claim 1, wherein stowing the one or more LTA vehicles from the network of LTA vehicles comprises:

attaching, operably to the mobile platform by the one or more LTA vehicles;

deflating the one or more LTA vehicles by removing the lighter than air substance from the one or more LTA vehicle;

disassembling the one or more LTA vehicle; and storing the modular components from the one or more LTA vehicle in the mobile platform.

13. The method of claim 12, wherein deflating the one or more LTA vehicles by removing the lighter than air substance from the one or more LTA vehicle comprises:

compressing a lighter than air substance; and pumping the compressed lighter than air substance into a storage reservoir.

14. A system for managing and controlling a network of lighter than air vehicles comprising:

one or more lighter than air (LTA) vehicles within the network of LTA vehicles;

a plurality of modular components for assembly into the one or more LTA vehicles in the network of LTA vehicles;

a plurality of payloads for deployment on one or more LTA vehicles in the network of LTA vehicles;

a plurality of remote controller devices used to interface with the one or more LTA vehicles in the network of LTA vehicles;

one or more decision modules for determining a desirable list of components to be assembled to make the one or more LTA vehicles in the network of LTA vehicles for a first mission, and for re-determining the desirable list of components to be assembled to make the one or more LTA vehicles in the network of LTA vehicles for a second mission;

one or more context modules for analyzing data received from the one or more LTA vehicles in the network of LTA vehicles; and a plurality of mobile platforms for providing storage, transport and maintenance for the plurality of modular components and the one or more LTA vehicles, wherein the plurality of modular components comprise:

a plurality of different sized envelopes selectable based on gas selected and payload requirements;

a plurality of fins;

a plurality of wings;

a plurality of gondolas including a conformal gondola with keel, a conformal gondola with spine, and a non-confer gondola selectable based on mission length and stability and maneuverability requirements; and a plurality of propulsion means including an internal combustion engine and an electric motor selectable based on mission noise and payload requirements.

15. A system for managing and controlling a network of lighter than air vehicles comprising:

one or more lighter than air (LTA) vehicles within the network of LTA vehicles;

a plurality of modular components for assembly into the one or more LTA vehicles in the network of LTA vehicles;

a plurality of payloads for deployment on one or more LTA vehicles in the network of LTA vehicles;

a plurality of remote controller devices used to interface with the one or more LTA vehicles in the network of LTA vehicles;

one or more decision modules for determining a desirable number of LTA vehicles to be utilized in the network of LTA vehicles and a desirable list of components to be assembled to make the one or more LTA vehicles in the network of LTA vehicles for a first mission, and for re-determining the desirable number of LTA vehicles to be utilized in the network of LTA vehicles and the desirable list of components to be assembled to make the one or more LTA vehicles in the network of LTA vehicles for a second mission, the desirable number of LTA vehicles and the desirable list of components being determined based on a plurality of entered mission parameters;

one or more context modules for analyzing data received from the one or more LTA vehicles in the network of LTA vehicles; and a plurality of mobile platforms for providing storage, transport and maintenance for the plurality of modular components and the one or more LTA vehicles, wherein the plurality of modular components comprise:

a plurality of different sized envelopes selectable based on gas selected and payload requirements;

a plurality of fins;

a plurality of wings;

a plurality of gondolas including a conformal gondola with keel, a conformal gondola with spine, and a non-conformal gondola selectable based on mission length and stability and maneuverability requirements; and a plurality of propulsion means including an internal combustion engine and an electric motor selectable based on mission noise and payload requirements.

* * * * *